United States Patent
Naganuma et al.

(10) Patent No.: US 9,889,432 B2
(45) Date of Patent: Feb. 13, 2018

(54) METHOD FOR PRODUCING CATALYST FOR EXHAUST GAS REMOVAL AND CATALYST OBTAINED BY THE PRODUCTION METHOD

(71) Applicants: Yuki Naganuma, Nagoya (JP); Yuki Aoki, Seto (JP); Hiromasa Suzuki, Toyota (JP)

(72) Inventors: Yuki Naganuma, Nagoya (JP); Yuki Aoki, Seto (JP); Hiromasa Suzuki, Toyota (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 251 days.

(21) Appl. No.: 14/439,936

(22) PCT Filed: Nov. 28, 2013

(86) PCT No.: PCT/JP2013/082037
§ 371 (c)(1),
(2) Date: Apr. 30, 2015

(87) PCT Pub. No.: WO2014/087915
PCT Pub. Date: Jun. 12, 2014

(65) Prior Publication Data
US 2015/0321176 A1    Nov. 12, 2015

(30) Foreign Application Priority Data
Dec. 3, 2012 (JP) ................. 2012-264167

(51) Int. Cl.
*B01J 23/46* (2006.01)
*B01J 37/02* (2006.01)
*B01J 37/16* (2006.01)
*B01D 53/94* (2006.01)
*B01J 35/00* (2006.01)

(52) U.S. Cl.
CPC .......... *B01J 23/468* (2013.01); *B01D 53/945* (2013.01); *B01J 37/0203* (2013.01); *B01J 37/0211* (2013.01); *B01J 37/16* (2013.01); *B01D 2255/1023* (2013.01); *B01D 2255/1028* (2013.01); *B01J 35/0013* (2013.01); *Y02T 10/22* (2013.01)

(58) Field of Classification Search
CPC ....................................................... B01J 23/468
See application file for complete search history.

(56) References Cited

U.S. PATENT DOCUMENTS

| | | | |
|---|---|---|---|
| 5,824,621 A * | 10/1998 | Abe | B01D 53/9418 502/305 |
| 6,746,510 B2 * | 6/2004 | Kurihara | B22F 1/0018 75/345 |
| 2014/0066299 A1 * | 3/2014 | Gerlinger | B01J 37/086 502/240 |

FOREIGN PATENT DOCUMENTS

| | | | |
|---|---|---|---|
| JP | 08-294624 A | 11/1996 | |
| JP | 2000-279824 A | 10/2000 | |
| JP | 2004-148166 A | 5/2004 | |
| JP | 2012-55857 A | 3/2012 | |

OTHER PUBLICATIONS

Monodisperse iron-based particles: precipitation in liquid polyols Gullaume Viau et al. J. Mater. Chem. V 6, pp. 1047-1053, 1996.*

* cited by examiner

*Primary Examiner* — Douglas B Call
(74) *Attorney, Agent, or Firm* — Sughrue Mion, PLLC

(57) ABSTRACT

An objective of the present invention is to provide a method for producing a catalyst for exhaust gas removal having excellent heat tolerance and purification performance within a wide range of atmospheres and a catalyst obtained by the production method.
The present invention relates to a method for supporting catalyst metal particles, comprising: (a) adding an iridium precursor and a palladium precursor to a solvent containing at least one member selected from the group consisting of polyvinylpyrrolidone, N-methylpyrrolidone, N-vinyl-2-pyrrolidone, and ethylene glycol; (b) adding a reducing agent to the obtained catalyst metal colloid; (c) obtaining a concentrated solution containing catalyst metal particles by subjecting the obtained solution to heat reflux; and (d) supporting the catalyst metal particles on a carrier, wherein the iridium content of the catalyst metal particles accounts for 3% to 10% by mass of the total mass of iridium and palladium.

4 Claims, 11 Drawing Sheets

METHOD FOR PRODUCING CATALYST FOR EXHAUST GAS REMOVAL AND CATALYST OBTAINED BY THE PRODUCTION METHOD

CROSS REFERENCE TO RELATED APPLICATIONS

This is a National Stage of International Application No. PCT/JP2013/082037 filed Nov. 28, 2013, claiming priority based on Japanese Patent Application No. 2012-264167 filed Dec. 3, 2012, the contents of all of which are incorporated herein by reference in their entirety.

TECHNICAL FIELD

The present invention relates to a method for producing a catalyst for exhaust gas removal and a catalyst obtained by the production method.

BACKGROUND ART

An exhaust gas discharged by an internal combustion engine of a vehicle or the like contains hazardous gases such as carbon monoxide (CO), nitric oxide (NOx), and unburned carbon hydride (HC). In general, a palladium catalyst is used as a catalyst for exhaust gas purification (a so-called ternary catalyst) in order to degrade such hazardous gases, because palladium is less expensive than rhodium. However, in terms of heat tolerance, NOx purification performance, etc., palladium catalysts are inferior to highly active rhodium catalysts, which has been problematic. Moreover, since palladium is a noble metal, there is a need to improve activity of palladium catalysts in order to reduce the consumption of palladium itself.

In addition, ternary catalysts for diesel or lean-burn engines have been conventionally developed. However, control of gasoline vehicles is adjusted within a range of stoichiometric atmospheres. Meanwhile, it is predicted that the use of fuel cut-off (F/C) means for gasoline vehicles will increase in the future for the improvement of fuel efficiency. In this regard, performance improvement in a lean atmosphere would become more important. Therefore, there is a demand for ternary catalysts capable of desired activity in environments with different air-fuel ratios (A/F), such as a lean atmosphere, a stoichiometric atmosphere, or a rich atmosphere.

Patent Document 1 discloses a method for supporting a polymer chelated metal catalyst, comprising a step of supporting a composite metal colloid on a carrier, the composite metal colloid being obtained by forming chelate bonds between at least two different catalyst metals using a chelator. Patent Document 1 also discloses that a specific chelator is used for improving the dispersibility of barium because sufficient NOx storage capacity cannot be obtained when barium is supported on a catalyst comprising a polyvinylpyrrolidone platinum/rhodium composite colloid.

Patent Document 2 discloses a catalyst for exhaust gas purification, which is formed with a noble metal and a base material supporting the noble metal. In addition, Patent Document 3 discloses a catalyst for exhaust gas purification, which comprises a porous carrier that supports palladium and iridium, palladium and iridium being formed into an alloy on the porous carrier.

Meanwhile, neither Patent Document 2 nor 3 discloses that catalyst metal particles can be obtained by treating a colloidal solution containing two different noble metals such that the noble metals are reduced at the same time.

Conventional catalysts for exhaust gas removal are specialized for the reduction of NOx and the improvement of quality of water vapor of HC. This means that sufficient purification performance for all of CO, NOx, and HC cannot be expected from the conventional catalysts.

Accordingly, it has been required to develop a palladium catalyst having further improved activity that can be used within a wide range of atmospheres.

PRIOR ART DOCUMENTS

Patent Documents

Patent Document 1: JP Patent Publication (Kokai) No. 2000-279824 A
Patent Document 2: JP Patent Publication (Kokai) No. 2004-148166 A
Patent Document 3: JP Patent Publication (Kokai) No. H08-294624 A (1996)

SUMMARY OF THE INVENTION

Problem to Be Solved by the Invention

The object of the present invention is to provide a method for producing a catalyst for exhaust gas removal having excellent heat tolerance and purification performance within a wide range of atmospheres and a catalyst obtained by the production method.

Means for Solving the Problem

The present inventors discovered that when a catalyst metal colloid containing iridium and palladium is subjected to heat reflux in order to reduce both metals at the same time in the presence of polyvinylpyrrolidone or the like, both such metals are sufficiently alloyed, thereby making it possible to obtain a catalyst for exhaust gas removal having desired activity. This has led to the completion of the present invention. Specifically, the present invention encompasses the following inventions.

(1) A method for supporting catalyst metal particles, comprising:
  (a) adding an iridium precursor and a palladium precursor to a solvent containing at least one member selected from the group consisting of polyvinylpyrrolidone, N-methylpyrrolidone, N-vinyl-2-pyrrolidone, and ethylene glycol;
  (b) adding a reducing agent to the obtained catalyst metal colloid;
  (c) obtaining a concentrated solution containing catalyst metal particles by subjecting the obtained solution to heat reflux; and
  (d) supporting the catalyst metal particles on a carrier,
  wherein the iridium content of the catalyst metal particles accounts for 3% to 10% by mass of the total mass of iridium and palladium.

(2) The method according (1), wherein the iridium content of the catalyst metal particles accounts for 3% to 7% by mass of the total mass of iridium and palladium.

(3) A catalyst for exhaust gas removal, which is obtained by the method according to (1) or (2).

This description includes all or part of the contents as disclosed in the description and/or drawings of Japanese Patent Application No. 2012-264167, to which the present application claims priority.

Effects of the Invention

According to the method of the present invention, catalysts for exhaust gas purification having excellent heat tolerance and purification performance within a wide range of atmospheres can be obtained.

BRIEF DESCRIPTION OF THE DRAWINGS

FIG. 1-1 shows the results of a temperature characteristics test for a catalyst of Comparative Example 1 (mass ratio of Pd:Ir=100:0) before durability tests in a rich atmosphere (A), a stoichiometric atmosphere (B), and a lean atmosphere (C).

FIG. 1-2 shows the results of a temperature characteristics test for a catalyst of Comparative Example 2 (mass ratio of Pd:Ir=0:100) before endurances test in a rich atmosphere (A), a stoichiometric atmosphere (B), and a lean atmosphere (C).

FIG. 2-1 shows the results of a temperature characteristics test for a catalyst of Comparative Example 1 (mass ratio of Pd:Ir=100:0) after durability tests in a rich atmosphere (A), a stoichiometric atmosphere (B), and a lean atmosphere (C).

FIG. 2-2 shows the results of a temperature characteristics test for a catalyst of Comparative Example 2 (mass ratio of Pd:Ir=0:100) after durability tests in a rich atmosphere (A), a stoichiometric atmosphere (B), and a lean atmosphere (C).

FIG. 3-1 shows the relationship between the proportion of iridium added to a catalyst after a durability test at an atmospheric temperature of 1100° C. in the air (hereafter referred to as "Air 1100° C. durability test") in a stoichiometric atmosphere and the temperature at a purification rate of 50% (T50 temperature) (A) and the relationship between the same and the purification rate (B).

FIG. 3-2 shows the relationship between the proportion of iridium added to a catalyst after an Air 1100° C. durability test in a lean atmosphere and the T50 temperature (A) and the relationship between the same and the purification rate (B).

FIG. 5-1 shows the results of a temperature characteristics test for a catalyst (A) of Example 3 and a catalyst (B) of Comparative Example 3 in a rich atmosphere.

FIG. 5-2 shows the results of a temperature characteristics test for a catalyst (A) of Example 3 and a catalyst (B) of Comparative Example 3 in a stoichiometric atmosphere.

FIG. 5-3 shows the results of a temperature characteristics test for a catalyst (A) of Example 3 and a catalyst (B) of Comparative Example 3 in a lean atmosphere.

EMBODIMENTS FOR CARRYING OUT THE INVENTION

The method for supporting catalyst metal particles of the present invention (hereafter also referred to as "the method of the present invention") comprises: (a) adding an iridium precursor and a palladium precursor to a solvent containing at least one member selected from the group consisting of polyvinylpyrrolidone, N-methylpyrrolidone, N-vinyl-2-pyrrolidone, and ethylene glycol; (b) adding a reducing agent to the obtained catalyst metal colloid; (c) obtaining a concentrated solution containing catalyst metal particles by subjecting the obtained solution to heat reflux; and (d) supporting the catalyst metal particles on a carrier, wherein the iridium content of the catalyst metal particles accounts for 3% to 10% by mass of the total mass of iridium and palladium.

The method of the present invention comprises, as the step (a), a step of adding an iridium precursor and a palladium precursor to a solvent containing at least one member selected from the group consisting of polyvinylpyrrolidone, N-methylpyrrolidone, N-vinyl-2-pyrrolidone, and ethylene glycol.

In the step (a), polyvinylpyrrolidone, N-methylpyrrolidone, N-vinyl-2-pyrrolidone, and ethylene glycol are used as protecting agents. The use of these protecting agents allows protection of clustered particles. Therefore, reactivity between palladium and iridium can be improved so as to increase the degree of alloying. It is preferable for a substance used as a protecting agent to have a pH level close to the pH levels of the iridium precursor and the palladium precursor such that no precipitate is formed upon addition of the iridium precursor and the palladium precursor. Preferably, polyvinylpyrrolidone and ethylene glycol can be used.

An example of the solvent that can be used in the step (a) is water.

In the step (a), the iridium precursor and the palladium precursor are added together to a solvent to obtain a catalyst metal colloid, and thus iridium and palladium in the obtained catalyst metal colloid are subjected to reduction treatment at the same time in the subsequent step (c). Iridium is more likely to form an oxide than palladium, and oxidation of iridium takes place prior to oxidation of palladium. Therefore, oxidation of palladium can be suppressed by combining palladium and iridium. Examples of the iridium precursor and the palladium precursor include salts or complexes of iridium and palladium. Examples of a salt or complex of iridium include iridium nitrate, iridium acetate, and iridium chloride. Examples of a salt or complex of palladium include palladium chloride, palladium acetate, and palladium nitrate.

The method of the present invention comprises, as the step (b), a step of adding a reducing agent to the catalyst metal colloid obtained in the step (a).

Examples of the reducing agent that can be used in the step (b) include methanol, ethanol, propanol, and butanol. Preferably, ethanol is used.

The method of the present invention comprises, as the step (c), a step of obtaining a concentrated solution containing catalyst metal particles by subjecting the obtained solution to heat reflux. Heat reflux of a palladium/iridium composite metal colloid causes suppression of aggregation and grain coarsening of catalyst particles (sintering), thereby allowing palladium and iridium to be positioned close to each other at the atomic level. As a result, activity of palladium can be maintained and the purification rate can be improved.

The iridium content of the obtained catalyst metal particles accounts for 3% to 10% by mass and preferably 3% to 7% by mass of the total mass of iridium and palladium. By adding a small amount of iridium within the above range for supporting the catalyst metal particles via a metal colloid supporting method, iridium can be nanoclustered to be thermally diffused such that a dense alloy of iridium and palladium can be formed. As a result of formation of such dense alloy, purification performance can be improved.

The method of the present invention comprises, as the step (d), a step of supporting catalyst metal particles on a carrier. Examples of carriers that can be used in the step (d) include alumina, silica, silica alumina, zeolite, mordenite, titania, ceria, zirconia, and ceria-zirconia composite oxide (CZ or ZC). Preferably, alumina and ceria-zirconia composite oxide (CZ or ZC) are used. Here, CZ denotes Ce-rich composite oxide and ZC denotes Zr-rich composite oxide.

A product obtained in the step (d) may be subjected to drying treatment performed as aftertreatment under ordinary pressure or reduced pressure. In addition, in order to promote alloying of catalyst particles, the method of the present invention may further include a step of calcining catalyst particles formed on a carrier at 200° C. to 1000° C. and preferably 400° C. to 800° C. after the step (b).

The present invention also relates to a catalyst (hereafter also referred to as the "catalyst of the present invention") obtained by the method of the present invention. The catalyst of the present invention comprises catalyst metal particles composed of iridium oxide and palladium oxide and a carrier supporting the catalyst metal particles. The iridium content of catalyst metal particles accounts for 3% to 10% by mass and preferably 3% to 7% by mass of the total mass of iridium and palladium. In addition, the content is calculated based on the amounts of catalyst raw materials. The iridium content of catalyst metal particles of a catalyst that can be actually obtained accounts for 3% to 15% by mass and preferably 3% to 11% by mass of the total mass of iridium and palladium.

The present invention is explained below with reference to the Examples below; however, the present invention is not limited to the scope of the Examples.

EXAMPLES

A rich atmosphere, a stoichiometric atmosphere, and a lean atmosphere have the compositions described below in the Examples.

Lean atmosphere: 14.7 ($CO_2$), 0.72 ($O_2$), 0.19 ($C_3H_6$), 0.17 (CO), 0.35 (NO), 3 ($H_2O$)
Stoichiometric atmosphere: 14.8 ($CO_2$), 0.35 ($O_2$), 0.29 ($C_3H_6$), 0.47 (CO), 0.33 (NO), 3 ($H_2O$)
Rich atmosphere: 14.2 ($CO_2$), 0.26 ($O_2$), 0.45 ($C_3H_6$), 1.3 (CO), 0.3 (NO), 3 ($H_2O$)

Example 1

Polyvinylpyrrolidone was added to pure water. Palladium chloride and iridium nitrate were added thereto and mixed therewith such that the mass ratio of Pd to Ir became 97:3 (i.e., the sum of the concentrations of both metals became 0.5% by mass). Further, ethanol (375 mL) was added, followed by stirring at approximately 50° C. for 30 minutes. Then, reflux was performed at approximately 90° C. for approximately 3 hours to carry out ethanol reduction. An appropriate amount of the obtained chemical concentrate was collected and supported on a 100%-alumina carrier.

A powder obtained as a result of drying was calcined in an electric furnace at 500° C. for 2 hours to form pellets. Thus, a catalyst was obtained.

Example 2

A catalyst was obtained in the manner described in Example 1 except that palladium chloride and iridium nitrate were added such that the mass ratio of Pd to Ir became 93:7.

Example 3

A catalyst was obtained in the manner described in Example 1 except that palladium chloride and iridium nitrate were added such that the mass ratio of Pd to Ir became 90:10.

Comparative Example 1

A catalyst was obtained in the manner described in Example 1 except that iridium nitrate was not used and the palladium concentration after the addition of palladium chloride was adjusted to 0.5% by mass.

Comparative Example 2

A catalyst was obtained in the manner described in Example 1 except that palladium chloride was not used and the iridium concentration after the addition of iridium nitrate was adjusted to 0.25% by mass.

Comparative Example 3

Palladium chloride was added to and mixed with pure water (palladium concentration: 0.5% by mass). Further, ethanol (375 mL) was added, followed by stirring at approximately 50° C. for 30 minutes. Then, reflux was performed at approximately 90° C. for approximately 3 hours to carry out ethanol reduction.

Meanwhile, polyvinylpyrrolidone was added to pure water. Iridium nitrate was added thereto and mixed therewith (iridium concentration: 0.25% by mass). Further, ethanol (187.5 mL) was added, followed by stirring at approximately 50° C. for 30 minutes. Then, reflux was performed at approximately 90° C. for approximately 3 hours to carry out ethanol reduction.

The obtained solutions were mixed such that the mass ratio of Pd to Ir became 90:10. Thus, a chemical concentrate was obtained. An appropriate amount of the obtained chemical concentrate was collected and supported on a 100%-alumina carrier.

A powder obtained as a result of drying was calcined in an electric furnace at 500° C. for 2 hours to form pellets. Thus, a catalyst was obtained.

The catalysts obtained in Examples 1-3 and Comparative Examples 1-3 were subjected to the tests described below.

1. Durability Test
(1) RL (Rich/Lean) 1100° C. durability test

An RL 1100° C. durability test was conducted by weighing each catalyst (6 g) and repeatedly and alternately introducing a rich atmosphere and a lean atmosphere in 5-minute cycles for 5 hours while maintaining the temperature at 1100° C.

(2) Air 1100° C. durability test

An Air 1100° C. durability test was conducted by weighing each catalyst (6 g) and introducing air for 5 hours while maintaining the temperature at 1100° C.

2. Temperature Characteristics Test

Each catalyst before and after the durability tests was subjected to a temperature characteristics test in a rich atmosphere, a stoichiometric atmosphere, and/or a lean atmosphere (flow rate: 10 L) regarding the total carbon hydride (THC), CO, and NOx purification rates, and the T50 temperature.

3. Amount of CO Adsorbed

Each catalyst was subjected to CO adsorption measurement by CO pulsing before and after the RL 1100° C. durability test and/or before and after the Air 1100° C. durability test.

4. Determination of Physical Properties of Catalysts

The noble metal ratios were determined by organic analysis. Each catalyst (approximately 0.1 g) was weighed and dissolved in a sodium peroxide aqueous solution. Water was added to adjust the amount to 200 ml. Each obtained sample was analyzed using inductively coupled plasma (ICP). The results are given below. In addition, each catalyst was used before the durability tests.

Example 1: Mass ratio of 95:5
Example 2: Mass ratio of 90:10
Example 3: Mass ratio of 87:13

Figure 11:
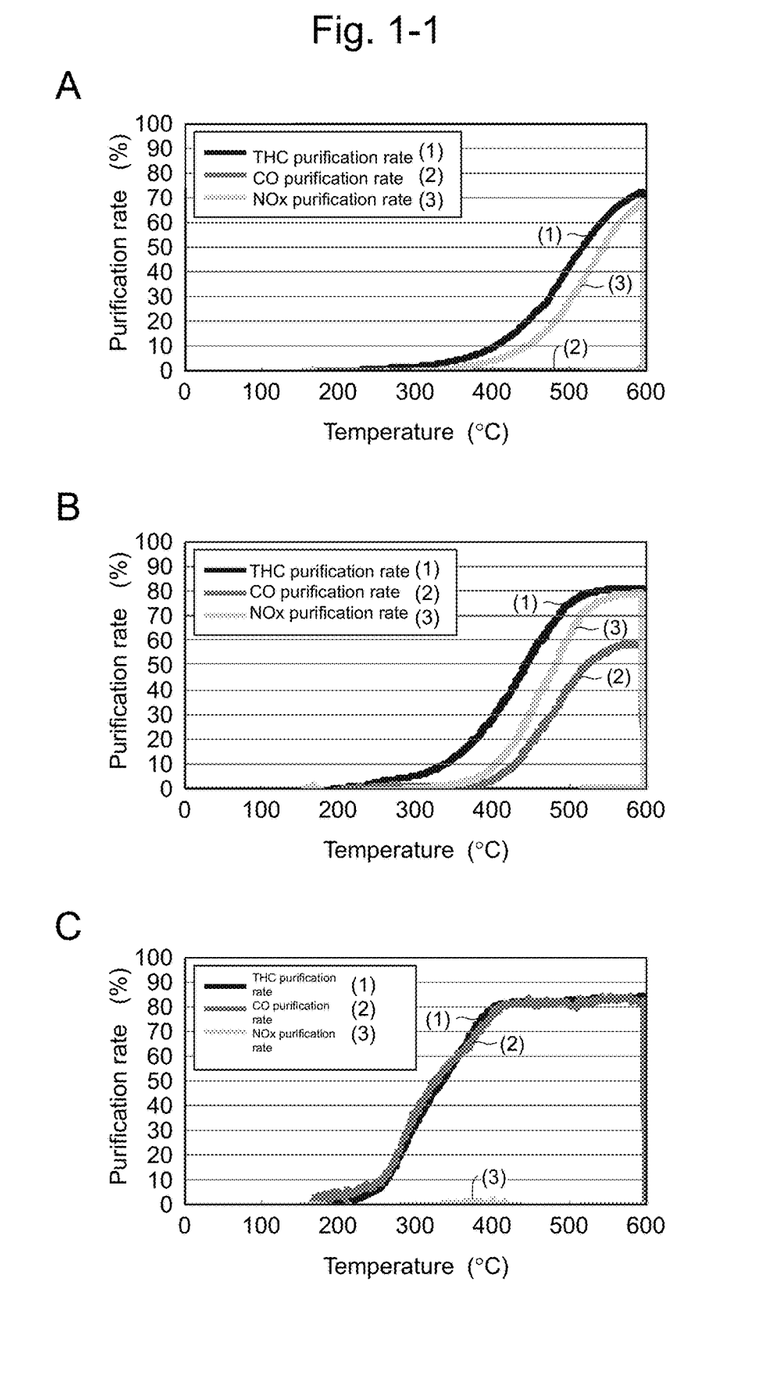
Figure 12:
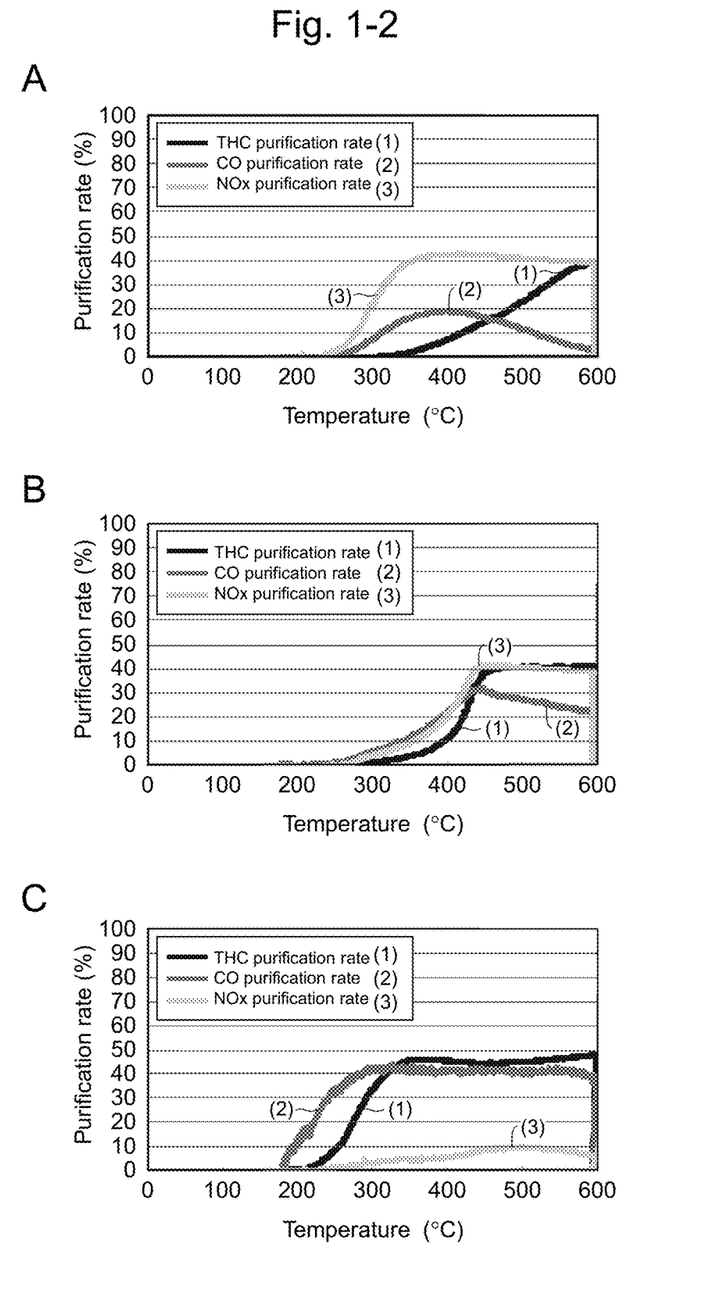
Figure 21:
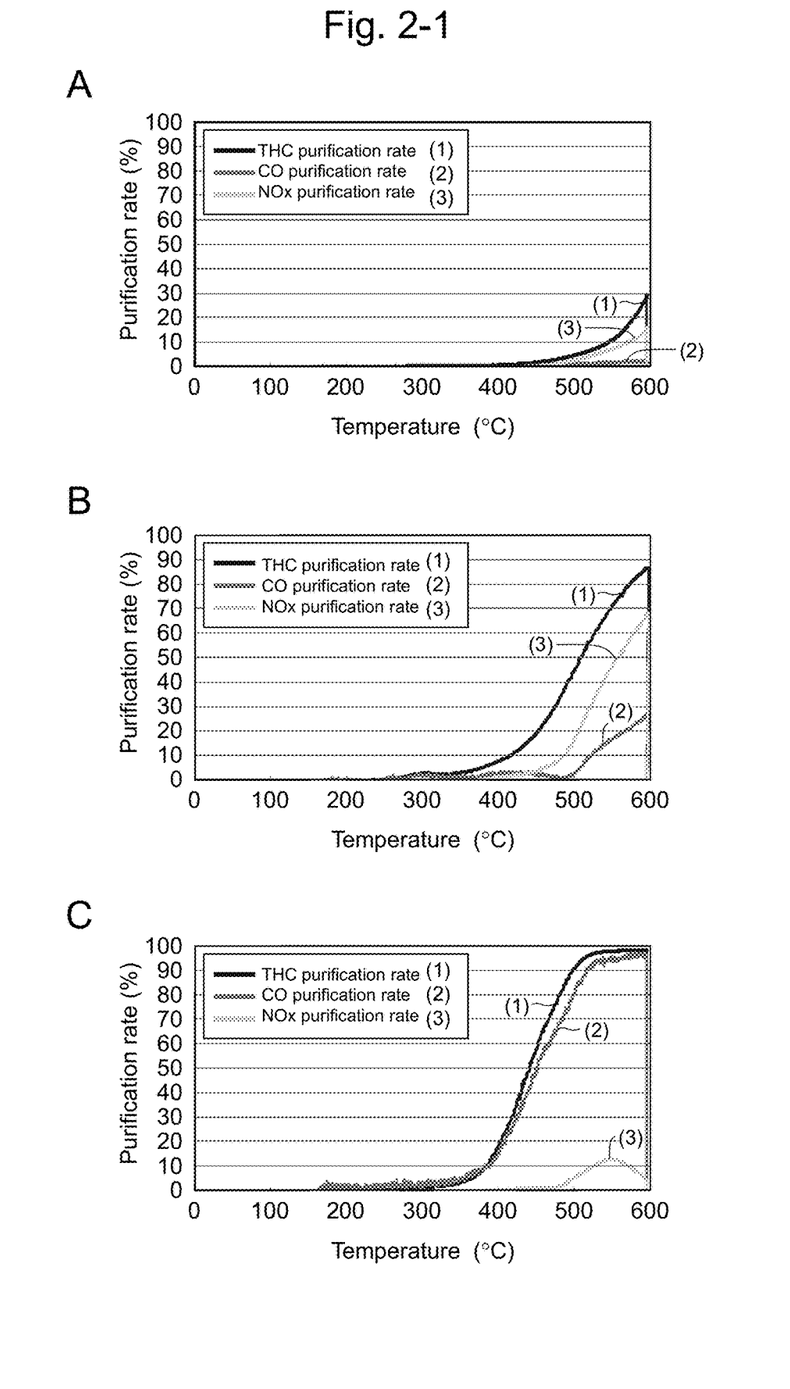
Figure 22:
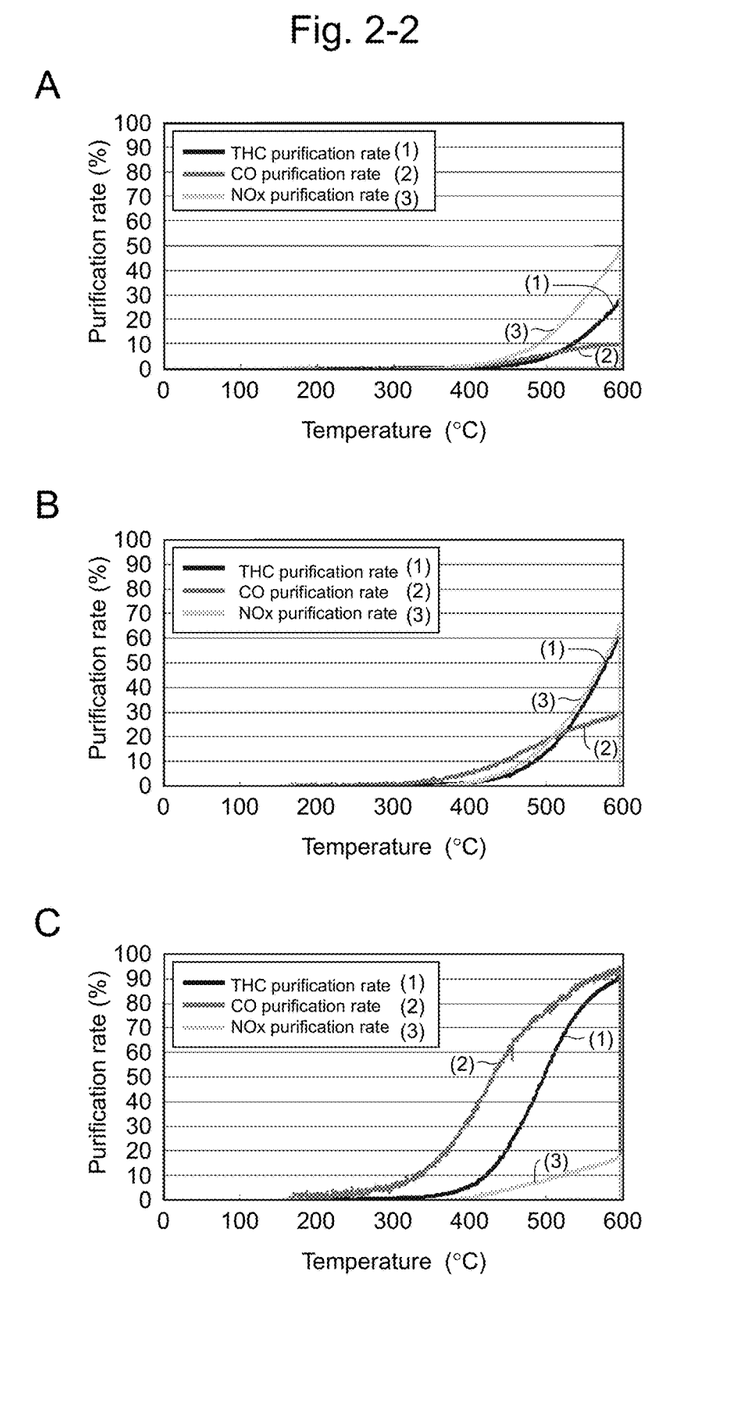

FIG. 1 shows the results of the temperature characteristics test for the catalyst of Comparative Example 1 (mass ratio of Pd:Ir=100:0) and the catalyst of Comparative Example 2 (mass ratio of Pd:Ir=0:100) before the durability tests in the respective atmospheres. The catalyst of Comparative Example 2 before the durability tests had a purification rate of 60% or higher in the rich atmosphere, the stoichiometric atmosphere, and the lean atmosphere (excluding the CO purification rate in the rich atmosphere and the NOx purification rate in the lean atmosphere). Meanwhile, the catalyst of Comparative Example 1 before the durability tests had a purification rate of about 50% because the concentration of Ir used was a half of the Pd concentration in Comparative Example 2. However, compared with the catalyst of Comparative Example 2, the catalyst of Comparative Example 1 was found to exhibit conversion activity starting from lower temperatures, especially in the lean atmosphere. This indicated that a catalyst having high conversion activity can be obtained with the addition of an appropriate amount of Ir with Pd serving as a main catalyst.

FIG. 2 shows the results of the temperature characteristics test for the catalyst of Comparative Example 1 (mass ratio of Pd:Ir=100:0) and the catalyst of Comparative Example 2 (mass ratio of Pd:Ir=0:100) after the durability tests in the respective atmospheres. FIG. 2 shows that the purification rates in terms of temperature characteristics for the catalysts of Comparative Examples 1 and 2 after the RL 1100° C. durability test tended to be substantially comparable to that before the durability test shown in FIG. 1. The catalyst of Comparative Example 1 showed remarkably high NOx purification performance, especially in the rich atmosphere. This indicated that a catalyst having high conversion activity can be obtained with the addition of an appropriate amount of Ir with Pd serving as a main catalyst.

Figure 31:
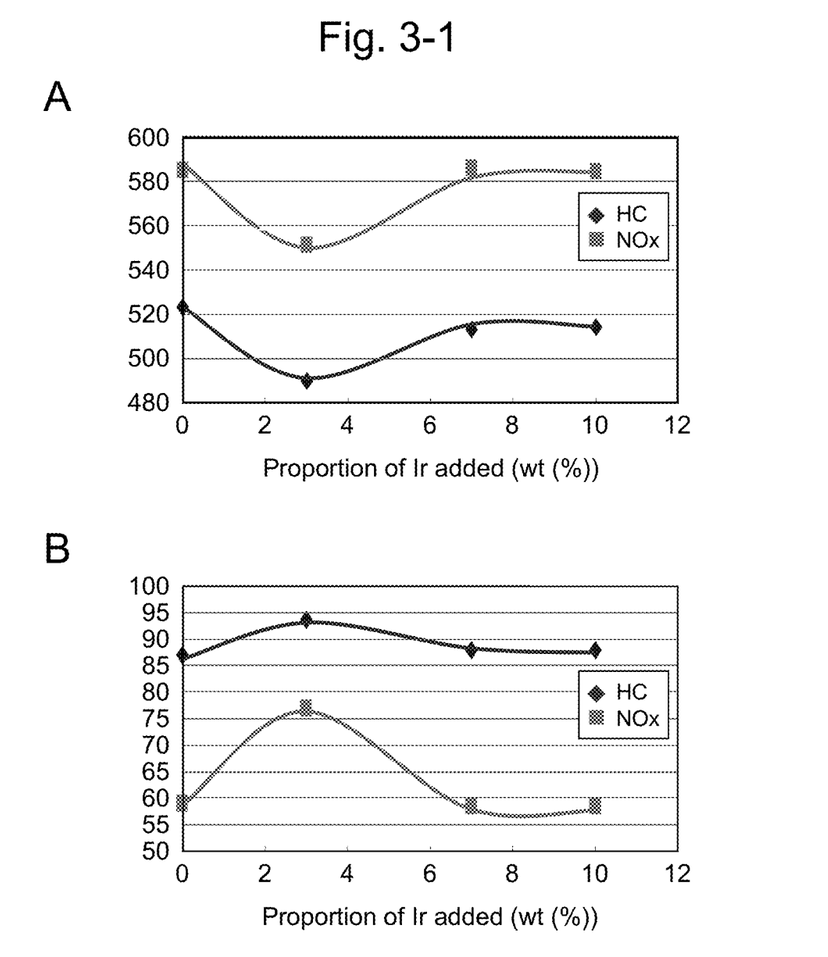
Figure 32:
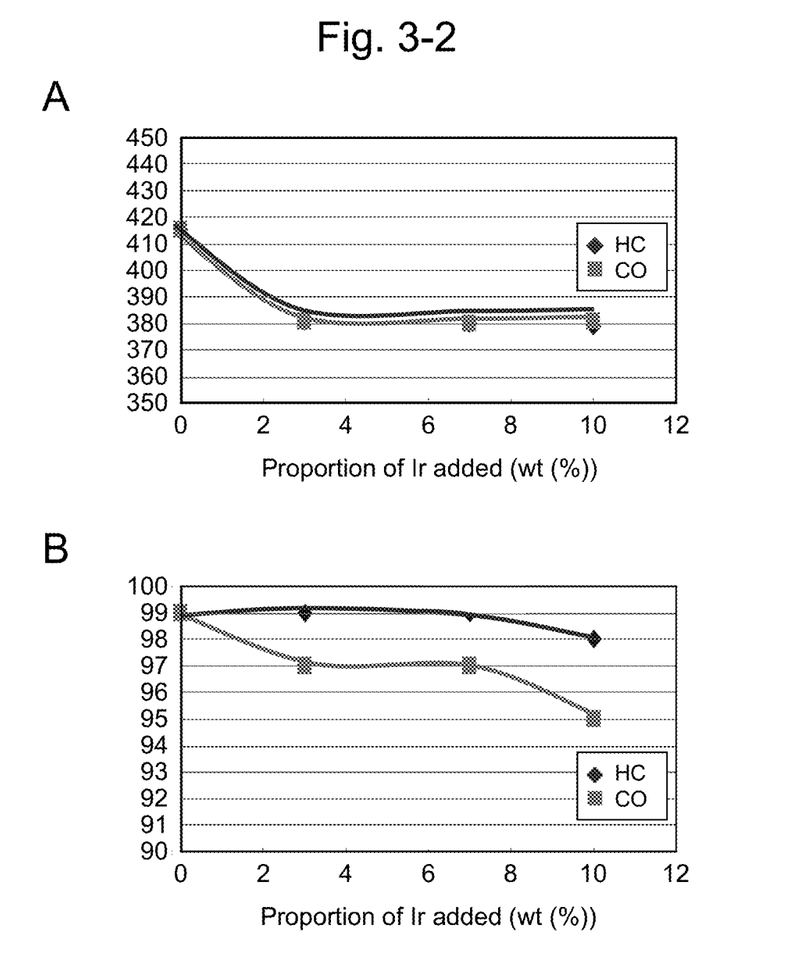
Figure 51:
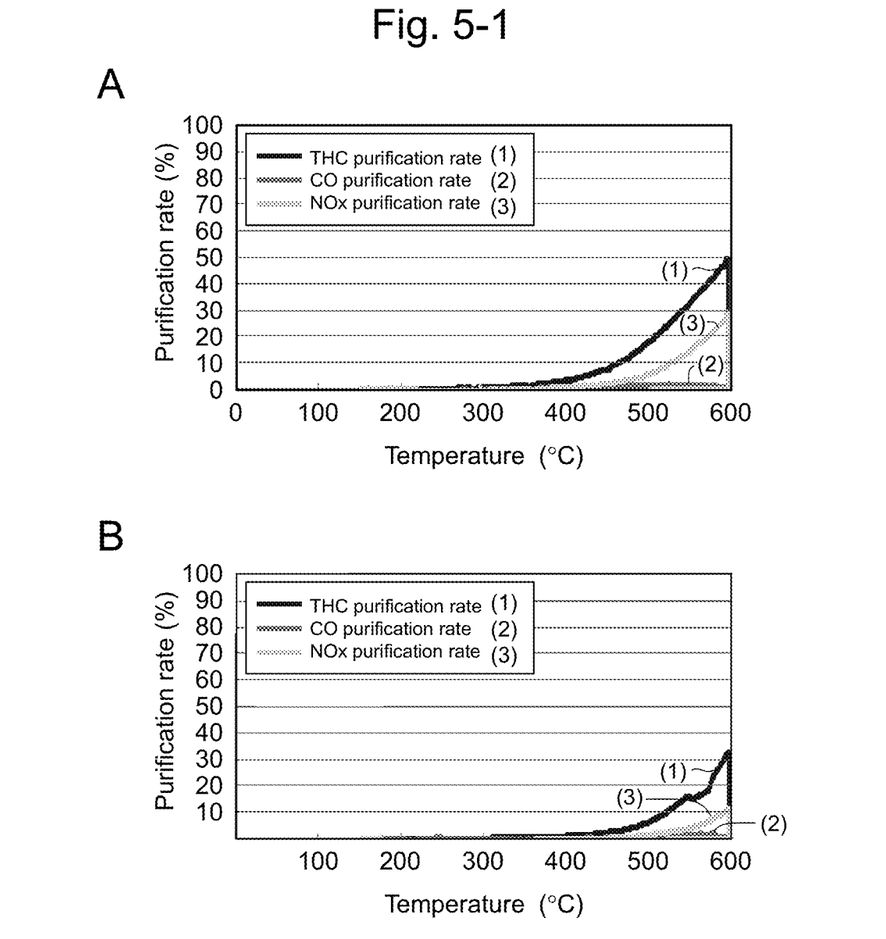
Figure 52:
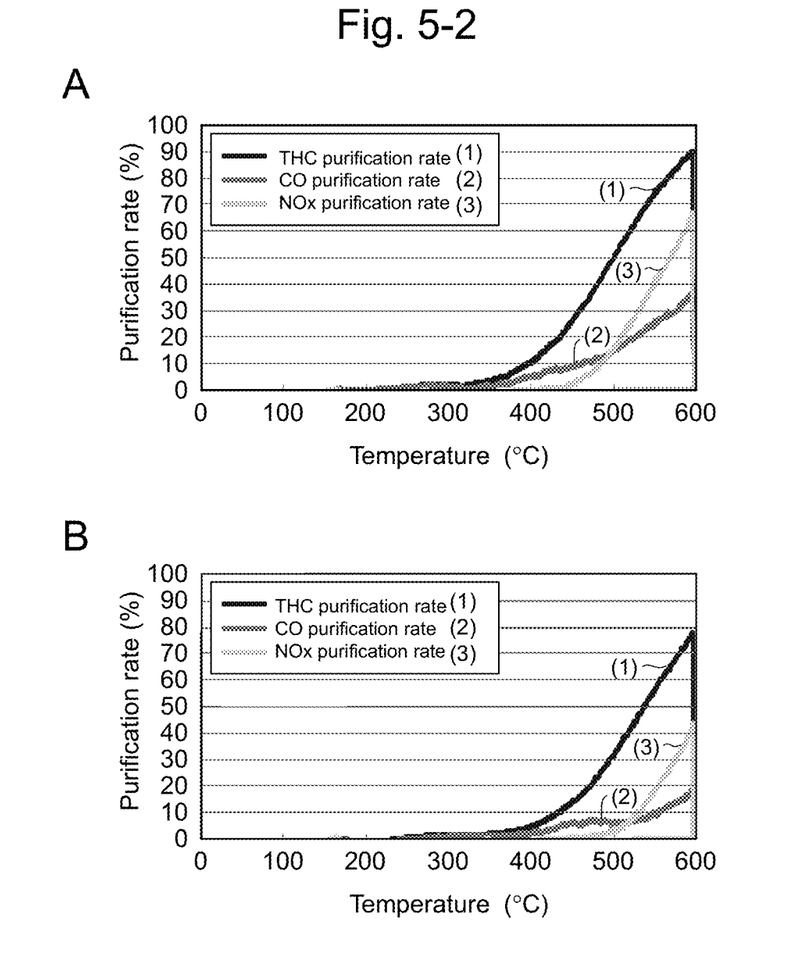
Figure 53:
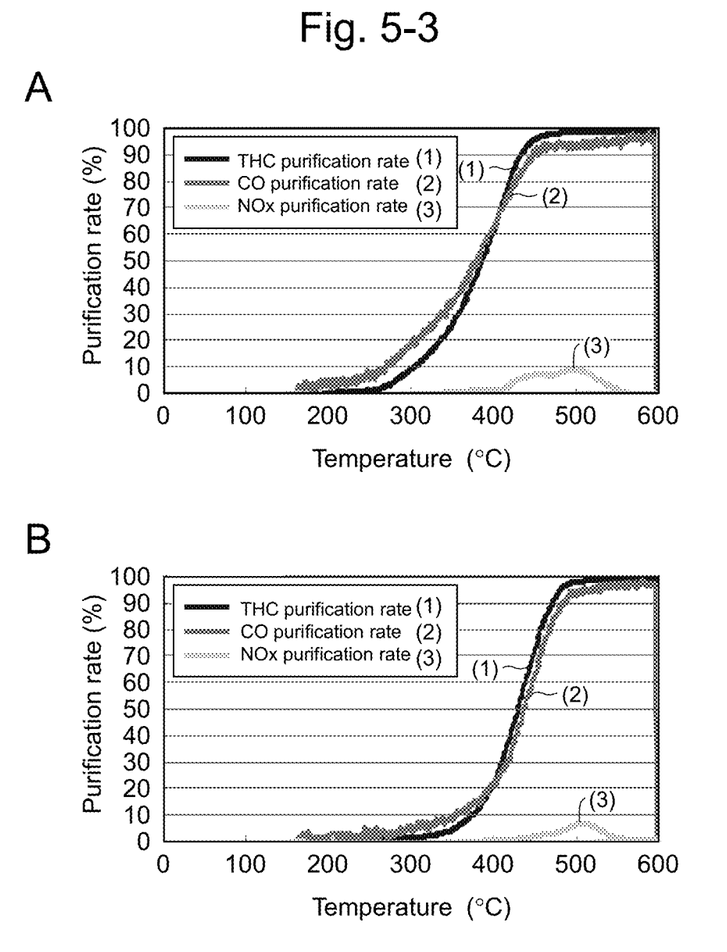

FIG. 3 shows the relationship between the proportion of iridium added to a catalyst after the Air 1100° C. durability test and the purification rate and the relationship between the same and the temperature (T50 temperature) at a purification rate of 50%. As is understood from FIG. 3, after the Air 1100° C. durability test, the catalyst containing Ir in addition to Pd of Example 1-3 has purification performance superior to that of the catalyst supporting Pd alone of Comparative Example 1. Under the lean atmosphere in particular, the T50 temperature decreased by approximately 40° C., indicating the remarkable effects achieved with the addition of Ir. Further, the NOx purification rate in the stoichiometric atmosphere for the catalyst of Example 1 (Pd:It=97:3) increased by approximately 15% compared with that of the catalyst of Comparative Example 1.

Meanwhile, after the RL 1100° C. durability test, the catalyst containing Ir in addition to Pd of Example 1-3 was found to have purification performance substantially equivalent to that of the catalyst supporting Pd alone of Comparative Example 1 (not shown).

Figure 4:
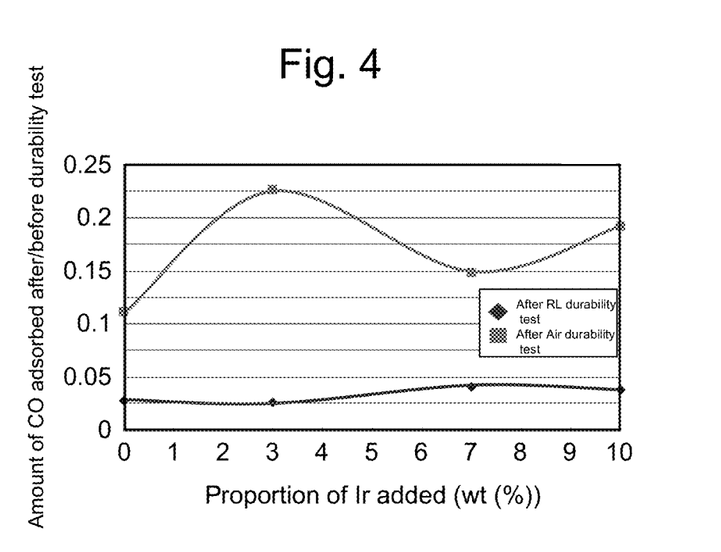
FIG. 4 shows the ratio of the proportion of iridium added to the amount of CO adsorbed before and after durability tests (a durability test at an atmospheric temperature of 1100° C. in a rich/lean atmosphere (hereafter referred to as "RL 1100° C. durability test") and an Air 1100° C. durability test).

FIG. 4 shows the proportions of iridium added and the amounts of CO adsorbed before and after the durability tests (RL 1100° C. durability test and Air 1100° C. durability test). FIG. 4 shows that the amount of CO adsorbed by the catalyst containing Ir in addition to Pd of Example 1-3 increased after the durability tests compared with the amount of CO adsorbed by the catalyst supporting Pd alone of Comparative Example 1. This indicates that a larger number of adsorption sites remain in the catalyst containing Ir in addition to Pd of Example 1-3 compared with the catalyst of Comparative Example 1. The amount of CO adsorbed remarkably increased, especially after the Air 1100° C. durability test. This was probably because Pd (melting point: approximately 1800° C.) was alloyed with Ir, which has a melting point higher than that of Pd (melting point: approximately 2500° C.), resulting in suppression of enlargement of catalyst particles. In particular, the molecular weight of Ir is approximately twice that of Pd. It is considered that Pd alloyed with Ir has fewer active sites than Pd alone if their percentages by mass are the same. In view of this, the addition of Ir causes unpredictable improvement of purification performance.

Figure 6:
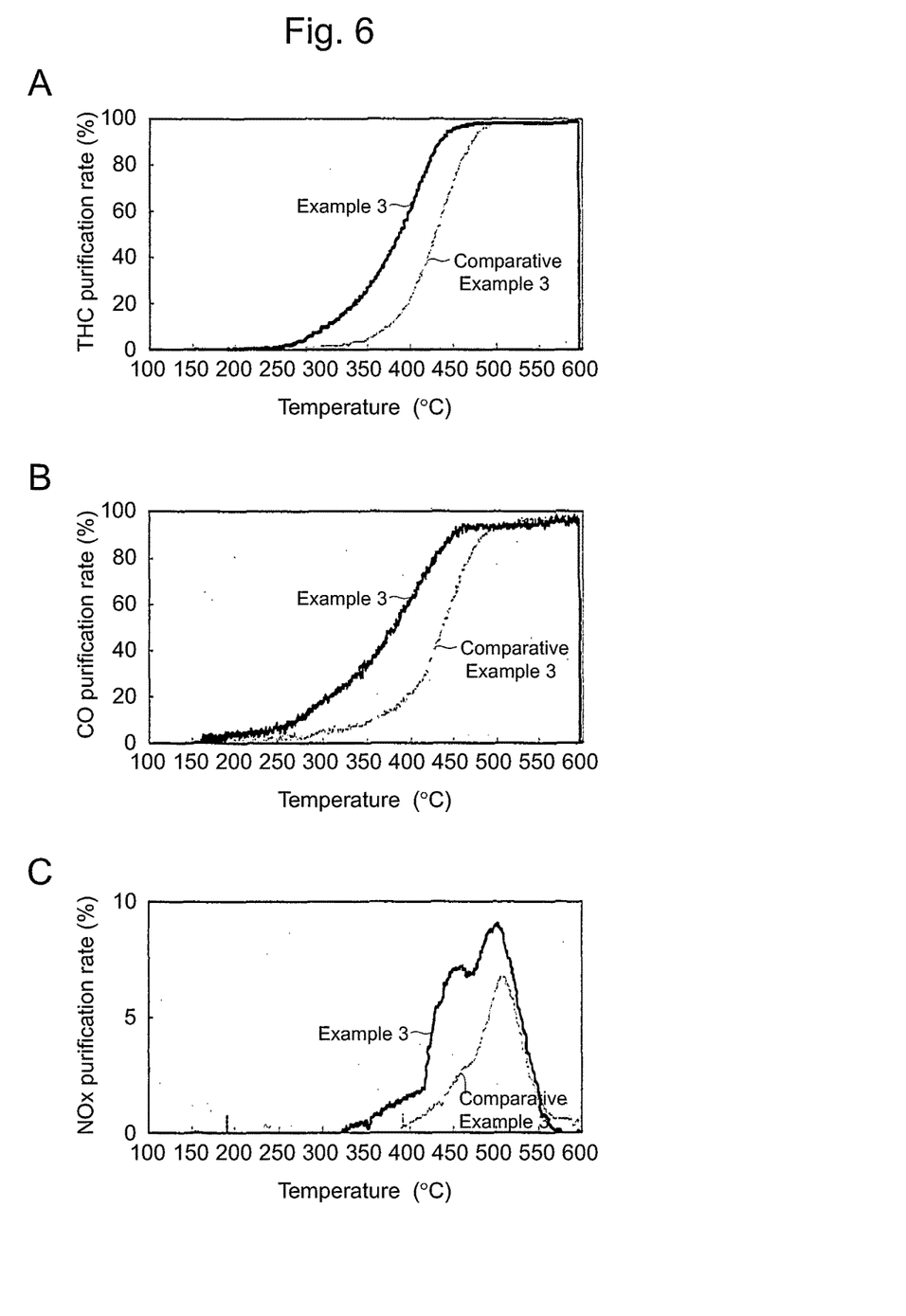
FIG. 6 shows the results of a temperature characteristics test for a catalyst of Example 3 and a catalyst of Comparative Example 3 in a lean atmosphere.

FIG. 5 shows the results of the temperature characteristics test for the catalyst of Example 3 in which Pd and Ir were subjected to ethanol reduction at the same time and the catalyst of Comparative Example 3 in which Pd and Ir were separately subjected to ethanol reduction in the respective atmospheres. A comparison of the catalyst of Example 3 and the catalyst of Comparative Example 3 shows that the use of the catalyst of Example 3 resulted in an overall improvement of purification performance in the rich atmosphere, the stoichiometric atmosphere, and the lean atmosphere. In particular, NOx purification performance increased by 10% to 20% in the rich atmosphere and the stoichiometric atmosphere. In addition, it was found that purification performance can be exhibited starting from lower temperatures in the lean atmosphere as well (see FIG. 6, in particular). Accordingly, it was found that purification performance improves across a wide range of atmospheres when Pd and Ir are subjected to ethanol reduction at the same time (bimetallization).

INDUSTRIAL APPLICABILITY

The catalyst obtained by the method of the present invention can be preferably applied to exhaust gas removal and especially vehicle exhaust gas removal.

All publications, patents, and patent applications cited herein are incorporated herein by reference in their entirety.

The invention claimed is:
1. A method for supporting alloyed catalyst metal particles, comprising:
   (a) adding an iridium precursor and a palladium precursor to a solvent containing at least one member selected from the group consisting of polyvinylpyrrolidone, N-methylpyrrolidone, N-vinyl-2-pyrrolidone, and ethylene glycol to obtain a catalyst metal colloid;
   (b) adding a reducing agent to the catalyst metal colloid to obtain a first solution;
   (c) obtaining a concentrated solution containing alloyed catalyst metal particles by subjecting the first solution to heat reflux and reducing the iridium precursor and the palladium precursor at the same time to iridium and palladium; and

(d) supporting the alloyed catalyst metal particles on a carrier, wherein an iridium content of the alloyed catalyst metal particles accounts for 3% to 10% by mass of the total mass of iridium and palladium.

2. The method according to claim 1, wherein the iridium content of the alloyed catalyst metal particles accounts for 3% to 7% by mass of the total mass of iridium and palladium.

3. A catalyst for exhaust gas removal, which is obtained by the method according to claim 1.

4. A catalyst for exhaust gas removal, which is obtained by the method according to claim 2.

\* \* \* \* \*